(12) United States Patent
de la Barré et al.

(10) Patent No.: US 9,992,484 B2
(45) Date of Patent: Jun. 5, 2018

(54) METHOD FOR REPRODUCING IMAGE INFORMATION, AND AUTOSTEREOSCOPIC SCREEN

(71) Applicant: Fraunhofer-Gesellschaft zur Foerderung der angewandten Forschung e.V., Munich (DE)

(72) Inventors: René de la Barré, Mittweida (DE); Silvio Jurk, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 206 days.

(21) Appl. No.: 14/891,671

(22) PCT Filed: May 17, 2013

(86) PCT No.: PCT/EP2013/001509
§ 371 (c)(1),
(2) Date: Nov. 16, 2015

(87) PCT Pub. No.: WO2014/183774
PCT Pub. Date: Nov. 20, 2014

(65) Prior Publication Data
US 2016/0105663 A1   Apr. 14, 2016

(51) Int. Cl.
*H04N 13/04*   (2006.01)

(52) U.S. Cl.
CPC ..... *H04N 13/0404* (2013.01); *H04N 13/0409* (2013.01); *H04N 13/0415* (2013.01); *H04N 13/0445* (2013.01); *H04N 13/0468* (2013.01)

(58) Field of Classification Search
CPC ................ H04N 13/0404; H04N 13/0409
See application file for complete search history.

(56) References Cited

U.S. PATENT DOCUMENTS

2008/0204663 A1   8/2008   Balogh
2009/0123030 A1   5/2009   De La Barre et al.

FOREIGN PATENT DOCUMENTS

CN   101394572 A   3/2009
CN   102149003 A   8/2011
(Continued)

OTHER PUBLICATIONS

International Preliminary Report on Patentability issued in PCT/EP2013/001509, dated Nov. 26, 2015, 11 pages.
(Continued)

*Primary Examiner* — Hung Dang
*Assistant Examiner* — Girumsew Wendmagegn
(74) *Attorney, Agent, or Firm* — Faegre Baker Daniels LLP

(57) ABSTRACT

A method for reproducing image information on an autostereoscopic screen that has a pixel matrix and an optical grid, wherein pixels are arranged to form rows arranged equidistantly next to one another, and the optical grid has strip-like structures parallel to the rows and arranged equidistantly next to one another. The method includes association of first and second coordinate values with each row, wherein the first coordinate value indicates a location on an axis that is oriented horizontally at the viewing interval in front of the screen and on which the propagation plane of the light exiting the row intersects the axis, and the second coordinate value indicates a position of the respective row or the strip-like structure, through which the light passes, in the lateral direction. For each row, an excerpt from an image is calculated by image synthesis, with the pixels being driven accordingly.

23 Claims, 5 Drawing Sheets

(56) References Cited

FOREIGN PATENT DOCUMENTS

| CN | 102213837 A | 10/2011 |
|---|---|---|
| CN | 102595175 A | 7/2012 |
| EP | 1122957 A1 | 8/2001 |
| EP | 2472889 A1 | 7/2012 |
| WO | 2010007787 A1 | 1/2010 |
| WO | 2014183774 A1 | 11/2014 |

OTHER PUBLICATIONS

Hoshino, H. et al., "Analysis of resolution limitation of integral photography", vol. 15, No. 8, Aug. 1998/ J. Opt. Soc. Am. A., pp. 2059-2065.
International Search Report and Written Opinion issued in PCT/EP2013/001509 dated Sep. 20, 2013, 14 pages.

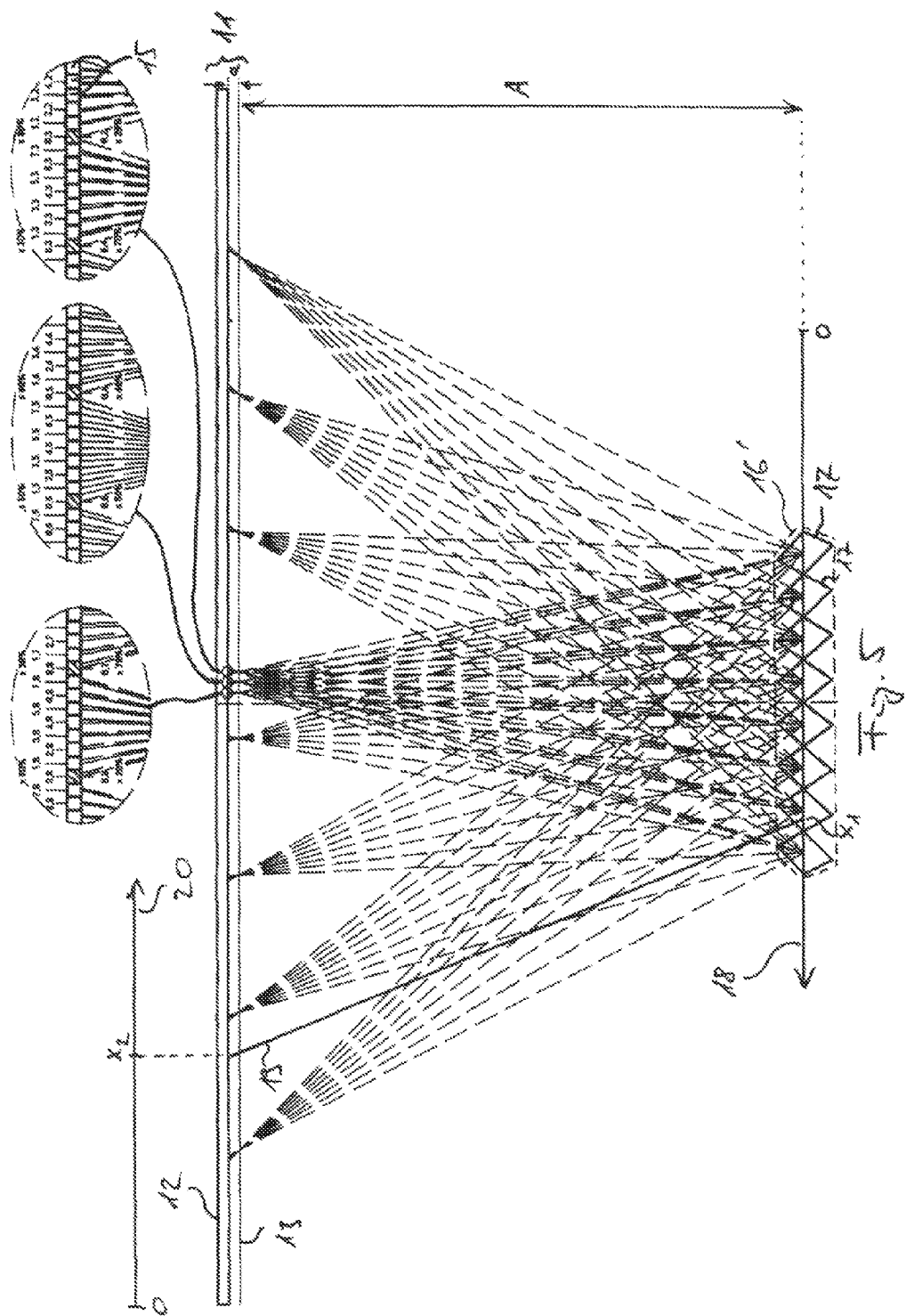

METHOD FOR REPRODUCING IMAGE INFORMATION, AND AUTOSTEREOSCOPIC SCREEN

CROSS-REFERENCE TO RELATED APPLICATIONS

This application is a national phase application of PCT Application No. PCT/EP2013/001509, internationally filed May 17, 2013, which is herein incorporated by reference in its entirety.

TECHNICAL FIELD

The disclosure relates to a method for reproducing picture information on an autostereoscopic screen, as well as to an autostereoscopic screen which is suitable for carrying out this method.

BACKGROUND

Thereby, the disclosure relates to the use of screens of a type which are known as autostereoscopic screens and used in order to represent 3D pictures such that they can be three-dimensionally perceived without special glasses. Such screens comprise a pixel matrix with a multitude of pixels as well as an optical grid which is arranged in front of the pixel matrix, wherein the pixels of the pixel matrix are arranged such that they form a multitude of rows which are arranged equidistantly next to one another and are with a vertical row direction or one which is inclined with respect to the vertical, and wherein the optical grid comprises a family of strip-like structures which are orientated parallel to the rows and are arranged equidistantly next to one another and in each case sets at least one defined propagation plane for light departing from the pixels, said propagation plane spanned from a defined horizontal propagation direction and the row direction.

A particular class of autostereoscopic screens, which are indicated as light field displays, are characterised by a certain geometry. With regard to these screens, a period length of the optical grid which is defined by a lateral offset of adjacent strip-like structures corresponds to an integer multiple of a lateral offset of the directly adjacent rows of pixels, wherein this factor is greater than two. Such a screen is described e.g. by H. Hoshino, F. Okano, H. Isono and I. Yuyama in J. Opt. Soc. Am. A 15, 2059, 1998.

The rows of such a matrix screen can be distributed in a cyclical sequence onto a number of channels which corresponds to the integer ratio between the row distance and the grid period. The light departing from the matrix screen is then guided or limited by the grid such that light departing from the pixels of each of these channels forms beams or light bundles, which are directed in a parallel manner behind the grid, on account of the special geometry. A designated use of the screen then envisages each of these channels being activated with picture information of exactly one view of a multitude of views which correspond to parallel projections of a scene from slightly differing directions. Then therefore exactly one of these views is reproduced on the pixels of each of these channels. A light field arises in a viewing space in front of the screen, in which light field a viewer of the screen can move and with both eyes sees two pictures which in each case result as a mixture of different ones of the parallel-projected views. These pictures then correspond to two centrally projected pictures which as stereoscopic half-pictures complement one another into a stereopicture, so that the viewer perceives the scene in a three-dimensional manner, and specifically from a direction which depends on his position. This type of picture reproduction is known as integral imaging. However, only relatively small picture depths can be realistically reproduced in this manner.

SUMMARY

The present disclosure describes measures which render possible the representation of 3D pictures with a comparatively large picture depth, with a screen of the described type.

A method for reproducing picture information on an autostereoscopic screen is therefore put forward, and this screen, as described beforehand, comprises a pixel matrix with a multitude of pixels as well as an optical grid which is arranged in front of the pixel matrix, wherein the pixels of the pixel matrix are arranged such that they form a multitude of rows which are arranged equidistantly next to one another and are with a vertical row direction or one which is inclined with respect to the vertical, and wherein the optical grid comprises a family of strip-like structures which are orientated parallel to the rows and are arranged equidistantly next to one another and in each case sets at least one defined propagation plane for light departing from the pixels, said propagation plane spanned from a defined horizontal propagation direction and the row direction, wherein a period length of the optical grid which is defined by a lateral offset of adjacent, strip-like structures is larger than a lateral offset of the directly adjacent rows by an integer factor n, wherein n is larger than two and, in some embodiments, significantly larger than two, for example eight or larger. With the suggested method, the pixel matrix is activated for an autostereoscopic viewing of a 3D picture from a defined viewing distance in front of the screen, wherein the method comprises the following steps:

assigning in each case a first local coordinate value and a second local coordinate value to each of the mentioned rows, wherein the first local coordinate value in each case specifies a location on a coordinate axis which is horizontally orientated at the viewing distance in front of the screen, at which location the defined propagation plane, set by the optical grid, of the light departing from the respective row, or one of these propagation planes, intersects this coordinate axis, and wherein the second local coordinate value, in the lateral direction specifies a position of the respective row or of the strip-like structure of the optical grid, through which position the light departing from the pixels of this row falls, for each of the rows, computing in each case an extract of a picture by way of picture synthesis, wherein this picture is given in each case by a perspective of the 3D picture to be reproduced, from a position which is defined by the first local coordinate value assigned to the respective row, and wherein the extract is defined in each case by a strip of this picture which in this picture has a lateral position corresponding to the second local coordinate value assigned to the respective row, and activating the pixels of the pixel matrix in a manner such that the extract computed in such a manner for this row is written into each of the rows.

What results from this, is a situation which can be compared to the representation of 3D pictures on conventional so-called multiview displays, with which a certain number of stereoscopic half-pictures of in each case one of several laterally offset viewing zones are visible at a viewing distance in front of the display, said viewing distance being dependent on the geometry of the applied display, and these half-pictures in pairs complement one another into a three-dimensionally perceivable stereopicture. The measures suggested here permit a picture reproduction which is comparable to this with regard to their effect, although the applied screen due to the integer ratio between the distance of the rows of pixels on the one hand and the period length of the optical grid on the other hand at first glance does appear to be suitable for such a picture reproduction. 3D pictures with a practically infinite picture depth can be reproduced by way of this, in contrast to the so-called integral imaging which is described above and for which screens of the type used here are actually conceived. An additional advantage results due to the fact that the viewing distance can be selected freely, at least within certain limits, in contrast to a conventional multiview display. The 3D picture thereby is visible with a good quality and is autostereoscopically perceivable as being three-dimensional, at least from an observation space of a certain width which lies at the viewing distance in front of the screen. Thereby, a viewer can move freely within this observation space, in particular laterally, with only the perceived perspective changes according to the lateral movement, without the three-dimensional impression being lost. The three-dimensional impression thereby, as is the case with a conventional multiview display, arises by way of two eyes of the viewer seeing two different pictures which represent the different perspectives and correspond at least to almost two stereoscopic half-pictures which complement one another into a stereopicture. Although these two pictures themselves consist of extracts of slightly different perspectives, the perspective differences between these two extracts however remain so small that they are not seen as being significantly disruptive.

Accordingly advantageous is also the autostereoscopic screen which is put forward by the disclosure and with which picture information can be represented in the described manner. This autostereoscopic screen comprises a pixel matrix with a multitude of pixels, an optical grid which is arranged in front of the pixel matrix and a control unit for activating the pixel matrix, wherein the pixels of the pixel matrix are arranged such that they form a multitude of rows which are arranged equidistantly next to one another and are with a vertical row direction or one which is inclined with respect to the vertical, wherein the optical grid comprises a family of strip-like structures which are orientated parallel to the rows and are arranged equidistantly next to one another, and in each case sets at least one defined propagation plane for light departing from the pixels, said propagation plane spanned from a defined horizontal propagation direction and the row direction, wherein a period length of the optical grid which is defined by a lateral offset of adjacent strip-like structures is greater than a lateral offset of the directly adjacent rows by an integer factor n, wherein n is larger than two and, in some embodiments, significantly larger than two, and wherein the control unit is configured to activate the pixel matrix for an autostereoscopic viewing of a 3D picture at a viewing distance in front of the screen and, for this, to carry out the following steps:

computing or evaluating an assignment, which assigns in each case a first local coordinate value and a second local coordinate value to each of the mentioned rows, wherein the first local coordinate value in each case specifies a location on a coordinate axis horizontally orientated at the viewing distance in front of the screen, at which location the defined propagation plane, set by the optical grid, of the light departing from the respective row, or one of these propagation planes, intersects this coordinate axis, and wherein the second local coordinate value, in the lateral direction specifies a position of the respective row or of the strip-like structure of the optical grid, through which position the light departing from the pixels of this row falls, for each of the rows, computing in each case an extract of a picture by way of picture synthesis, wherein this picture is given in each case by a perspective of the 3D picture to be reproduced, from a position which is defined by the first local coordinate value assigned to the respective row, and wherein the extract is defined in each case by a strip of this picture which in this picture has a lateral position corresponding to the second local coordinate value assigned to the respective row, and activating the pixels of the pixel matrix in a manner such that the extract computed for this row is written into each of the rows.

It is to be noted that, in embodiments, the coordinate axis runs in a straight manner and parallel to a plane defined by the pixel matrix or the optical grid. Both however are not absolutely necessary. Thus the coordinate axis under certain circumstances can also lie obliquely with respect to the screen. This would result in the observation space, from which the 3D picture is autostereoscopically visible, coming closer to the screen at a left end or being distanced further to the screen than at a right end. The coordinate axis could also be given by a line with an arcuate course, wherein the first local coordinate values are then defined by a one-dimensional parameterisation of this line, and in each case define a location on this line. Such a line is also to be understood as a coordinate axis in the broadest sense of the word.

In embodiments, the control unit is configured to determine brightness values of picture points of the extracts on computing the extracts and to write the extracts into the rows of the pixel matrix by way of actuating the pixels forming the respective row, with the brightness values determined for the picture points of the respective extract. The computation of the extracts can therefore include the determining of brightness values of picture points of the extracts, wherein the extracts are written into the rows of the pixel matrix, by way of the pixels forming the respective row being activated with the brightness valves determined for the picture points of the respective extract. The picture synthesis which is used for computing the extracts, also called rendering, can be carried out in a manner known per se. Conventional render methods can thus be applied for this, wherein an increased computational effort does not arise with such render methods or picture synthesis compared to conventional applications, since the relatively large number of different pictures of different perspectives do not need to be fully computed, but rather it is sufficient if the mentioned extracts, thus in each case only relatively small parts of these pictures are computed.

The pixel matrix of course can also comprise pixels of different primary colours, such as red, green and blue pixels, which can accordingly be activated with colour-dependent brightness values and of which three can be grouped into a coloured or colour-neutral pixel group. The pixel matrix can e.g. be given by a liquid crystal screen or an LED screen or a plasma screen. The pixels of the pixel matrix thereby can be arranged in a multitude of lines, wherein, in some embodiments, the mentioned rows of pixels can at the most comprise one pixel from the each of the lines. Thereby, the rows under certain circumstances can be nested such that the mentioned lateral offset of directly adjacent rows can even be smaller than a lateral offset of directly adjacent pixels in a line of the pixel matrix. With regard to the optical grid, it can again be the case of a lens grid or a slot grid, wherein the strip-like structures can be given by cylinder lenses or cylinder-lens-like lenses or by transparent slots.

The assignment of the first local coordinate value to the rows can be effected such that a number of, and in some embodiments, even much more than n different first local coordinate values are assigned to the different rows, so that the extracts which are computed for the rows are computed from a corresponding number of more than n different pictures with a corresponding number of more than n different perspectives. Therefore, there is nothing against determining the first local coordinate with an extremely high accuracy according to the geometric characteristics of the screen. The mentioned assignment can thus assign a number of more than n different first local coordinate values to the different rows, also with the suggested autostereoscopic screen, so that the control unit is configured to compute the extracts for the different rows of the pixel matrix from a corresponding number of more than n different pictures of a corresponding number of more than n different perspectives. The more accurately the first local coordinate value is thereby determined and the more finely graded are the intermediate values permitted to be, the better is the picture quality which can thereby be realised. The evaluation of the first local coordinate values thereby independent of the demanded accuracy is a beam-geometric task. Of course, the pixels have a finite extension which under certain circumstances is not negligible. Moreover, the light which departs from the pixels and falls through the optical grid normally always slightly fanned out in a lateral manner on account of the finite lateral extension of the strip-like structures. Then one should start in each case from a point lying centrally in the respective pixel, for example a centroid of an area of the pixel, for determining the mentioned propagation planes and propagation directions, wherein the propagation direction is defined such that the propagation plane which is defined by the propagation direction and by the row direction lies centrally in a light sliver (fan of light) departing from the respective pixel.

The optical grid in each case sets a finite number of different propagation planes with accordingly different horizontal propagation directions for the light departing from the pixels of each row or at least the pixels of some of the rows, and these propagation directions result due to the fact that the light falls through different ones of the strip-like structures of the optical grid. A propagation direction can be selected in each case from these propagation planes by way of keeping to an auxiliary condition or constraint which demands that the first local coordinate value lies within a defined interval, in order to determine the first local coordinate value assigned to the respective row. The mentioned assignment, in some embodiments of the suggested autostereoscopic screen, is therefore such that the first local coordinate value assigned to the respective row lies within a defined interval. Two boundaries or limits of this interval on the coordinate axis thereby define lateral limitations of the observation space which is mentioned above and from which the 3D picture can be autostereoscopically seen.

Embodiments of the suggested method or of the suggested autostereoscopic screed envisage the first local coordinate values being assigned to the rows such that the rows are distributed onto groups of, in each case n or also n+1 or n+2 directly adjacent rows, within which the first local coordinate values assigned to the rows of the respective group differ from row to row by a local coordinate difference which is equal for all groups, wherein the first local coordinate values which are assigned to the rows of each of these groups, in each case span a coordinate interval which is at least n-times larger than the mentioned local coordinate difference. As a rule, most of the mentioned groups will comprise exactly n rows, whereas a few groups are formed from n+1 or under certain circumstances from n+2 rows. The viewing distance can be increased or reduced by way of changing the division or distribution of the rows onto the mentioned groups, and thus the observation space, from which the reproduced 3D scene is autostereoscopically visible in a good quality, can either be pulled closer to the screen or displaced at a greater distance to the screen. The observation space can also be displaced laterally by way of this, if required.

The 3D picture which is reproduced in the described manner is visible and autostereoscopically perceivable in a three dimensional manner and with a comparatively good quality within the mentioned observation space. However, disturbances reducing the picture quality, and which may be visible as strips running in the row direction—for example obliquely—and lying parallel next to one another, can result in particular at the edges of the observation space. The cause of these disturbances is a crosstalk between adjacent rows of pixels, in which extracts of pictures from very different perspectives are reproduced. Extracts of parallel projections of the 3D scene with perspectives which in each case are only slightly different in most cases are reproduced on the rows of pixels which lie next to one another, in the case of the described activation. However, with each roughly nth jump in row, a significantly greater jump in perspective results—thus a larger jump between the first local coordinate values which are assigned to these rows—in the opposite direction, and this can lead to the mentioned disturbance. A measure which permits these disturbances at least to be lessened is outlined hereinafter. Thereby, averaged intensity values are written into some of the rows. This preferably relates in each case to one of the directly adjacent rows, into which the extracts of pictures of greatly differing perspectives are to be written, thus the rows of the pixel matrix, with which the mentioned greater perspective jumps occur. Thereby, it is indeed between contributions of the two pictures with the perspectives which correspond to the right and the left edge of the mentioned observation space in front of the screen that one averages.

In order to realise this, one can therefore envisage at least some of the rows which lie at an edge of one of the mentioned groups of rows additionally being assigned to the adjacent group of rows which connects to this edge of the group, and two first local coordinate values which are defined by two of the propagation planes accordingly being assigned to these rows, wherein accordingly in each case two extracts are computed for these row on the basis in each case of one of these two first local coordinate values and wherein the pixels of these rows are each activated with an averaged brightness value which results by way of averaging brightness values which are defined by these two excepts. The control unit in this case can therefore be configured in each case to accordingly compute two extracts on the basis in each case of one of these two first local coordinate values, for each of the last-mentioned rows, and to activate the pixels of these rows in each case with averaged brightness value which results by way of averaging brightness values defined by these extracts.

The mentioned averaged brightness values, with which the pixels of the rows are activated, to which rows two first local coordinate values are assigned and computed for the two extracts, are, in some embodiments, determined in each case as the sum of a first brightness value weighted by a first weighting factor, and of a second brightness value weighted by a second weighting factor, wherein the first brightness value is defined by a first of the two extracts for the respective pixel, and the second brightness value by the second of these two extracts for the same pixel. Of course, one does not rule out both weighting factors simply having a value of 0.5 in each case. The first weighting factor and the second weighting factor however under certain circumstances can also be defined for each of the rows of pixels concerned, in each case depending on how close the respective first local coordinate value lies to the boundary of the mentioned interval. An even better suppression of the mentioned disturbances can be achieved by way of this. The closer the first local coordinate value, on the basis of which the first extract is computed, lies to an interval boundary of the mentioned interval, the smaller should the first weighting factor defined in each case for one of the rows be. Accordingly, the closer the first local coordinate value, on the basis of which the second extract is computed, lies to an interval boundary of the mentioned interval, the smaller should the second weighting factor defined for the respective row be. Thereby, the second weighting factor is, in some embodiments, larger, the smaller the first weight factor is, and vice versa. The weighting factors can e.g. be defined such that a sum of the first weighting factor and the second weighting factor in each case add up to one for each of the rows of pixels concerned. The described computation or evaluation of the averaged brightness values and of the weighting factors which under certain circumstances are variably defined for this can be effected by the control unit which is suitably programmed for this.

The viewing distance, as already mentioned, can be variable and for this can e.g. be defined depending on an input command or a value measured by a tracking device. Accordingly, the control unit of the autostereoscopic screen can be configured to activate the pixel matrix in a manner dependent on an input command defining the viewing distance or on a measurement result determined by a tracking device. Thus a tracking device can be provided, which measures a distance of as pair of eyes of at least one viewer, to the screen, so that the viewing distance can be defined accordingly. The measurement result can also be used to carry out a lateral shifting of the observation space, in order to ensure that the viewer or each of the viewers is/are located within the observation space.

BRIEF DESCRIPTION OF THE DRAWINGS

Embodiments of the disclosure are hereinafter explained in more detail by way of the FIGS. 1 to 5. There are shown in.

DETAILED DESCRIPTION

Figure 1:
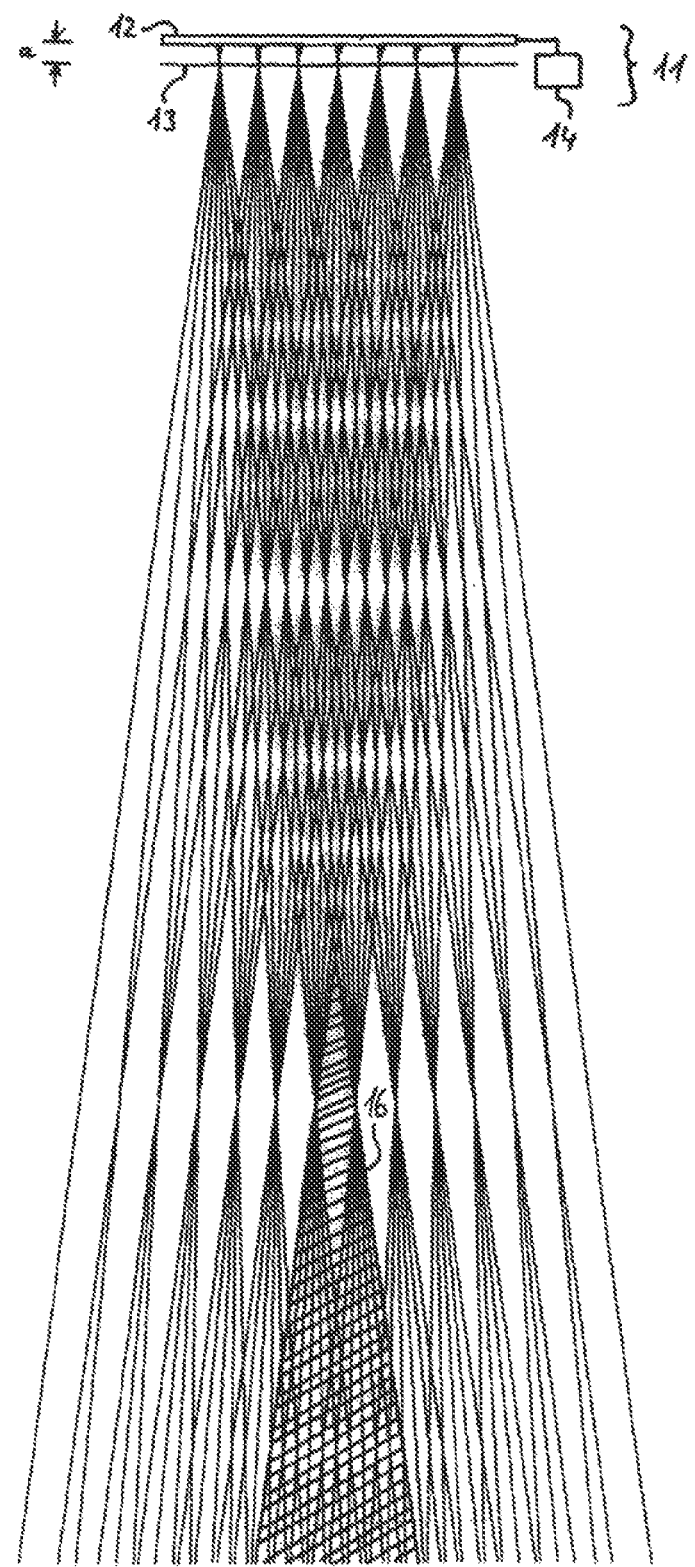
FIG. 1 a schematic view of an autostereoscopic screen and a viewer space in front of this screen, with a conventional activation of the screen, FIG. 2 a frontal view of a detail of a pixel matrix of this screen and of an optical grid arranged in front of this, FIG. 3 a representation, according to FIG. 2, with a modification of the screen, FIG. 4 an enlarged view of a detail of the screen from FIG. 1, with conventional activation indicated as integral imaging and FIG. 5 in a representation according to FIG. 4, a schematic view of the autostereoscopic screen of FIG. 1 and the viewing space in front of this screen, with a different type of activation of the screen in a manner put forward here.
Figure 2:
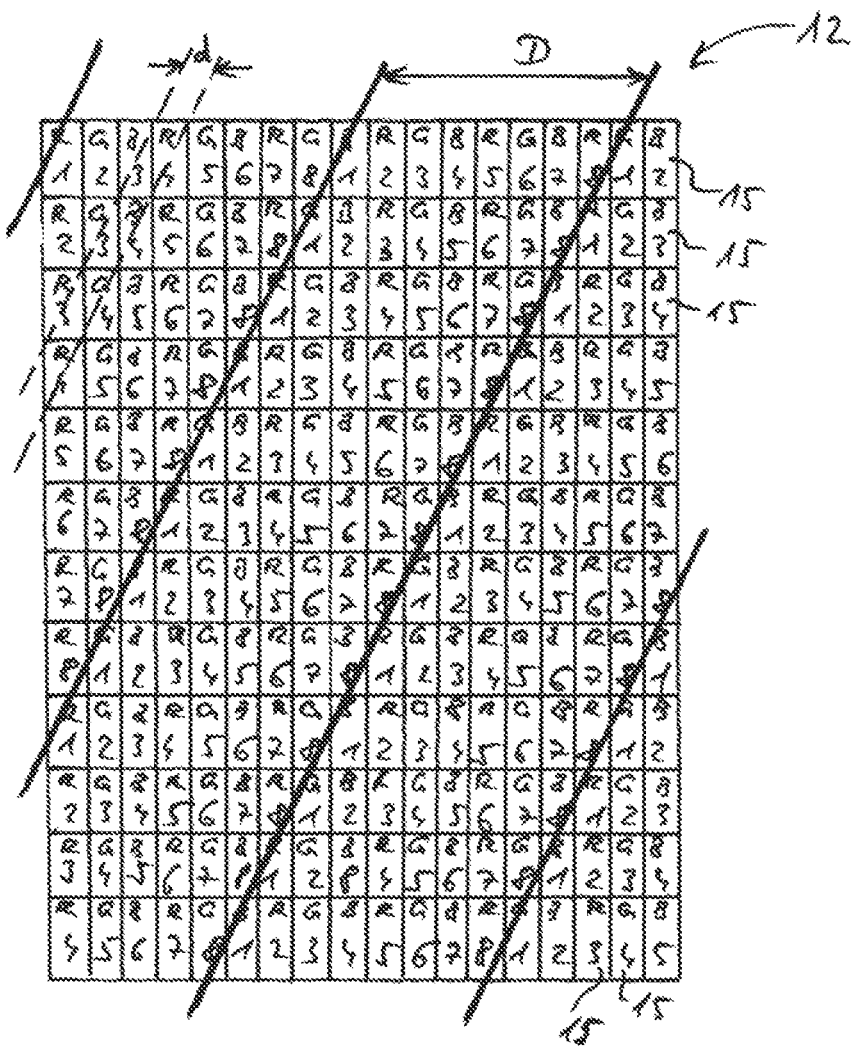

An autostereoscopic screen 11 which comprises a pixel matrix 12, an optical grid 13 arranged at a distance a in front of the pixel matrix 12, and a control unit 14 for activating the pixel matrix 12 is represented FIG. 1. FIG. 2 shows a detail of the pixel matrix 12. The same features in the different figures in each case are provided with the same reference numerals and are not explained again in the context of each of the figures. As is to be recognised in FIG. 2, the pixel matrix 12 comprises a multitude of pixels 15, wherein the pixels 15 of the pixel matrix 12 form a multitude of rows which are arranged equidistantly next to one another and with a row direction which is inclined with respect to the vertical in the present case. In FIG. 2, the position and the course of the respective row of pixels 15 are represented in each case by a dashed line, for two of these rows.

Thereby, a division of the pixels 15 onto eight subsets is illustrated in FIG. 2, and this division is carried out with a conventional application of the screen 11 of this type. With this division, the mentioned rows of pixels 15 are distributed from the left to right onto the subsets in a cyclical sequence. The subsets are thereby numbered from 1 to 8, wherein in FIG. 2 the pixels 15 are each provided with a number from 1 to 8, and this number corresponds to the number of the subset, to which the respective pixel 15 is assigned. The already mentioned rows are thereby formed by pixels of in each case only one of these subsets and at the most comprise one pixel 15 from each line of pixels 15. The numbering of the pixels 15 renders the inclined course of the rows easily recognisable.

With regard to the pixels 15, in the present case it is the case of pixels 15 of three different primary colours which in FIG. 2 are characterised by R for red, G for green or B for blue, according to their respective primary colour. Thereby, in each case three pixels 15 of the same row which are arranged above one another complement one another in the row direction in each case into a colour neutral pixel group which is to say a pixel group suitable for reproducing any colour. Of course, other modifications, with which more than three colours belong to a pixel group or the rows have a vertical course, are also conceivable, wherein the pixels are then to be arranged accordingly resorted on the pixel matrix 12 in accordance with the different primary colours. With regard to the pixel matrix 12, it can e.g. be the case of a liquid crystal screen, thus an LCD, or of a LED screen which is formed by a light diode matrix or also of a plasma screen.

Figure 3:
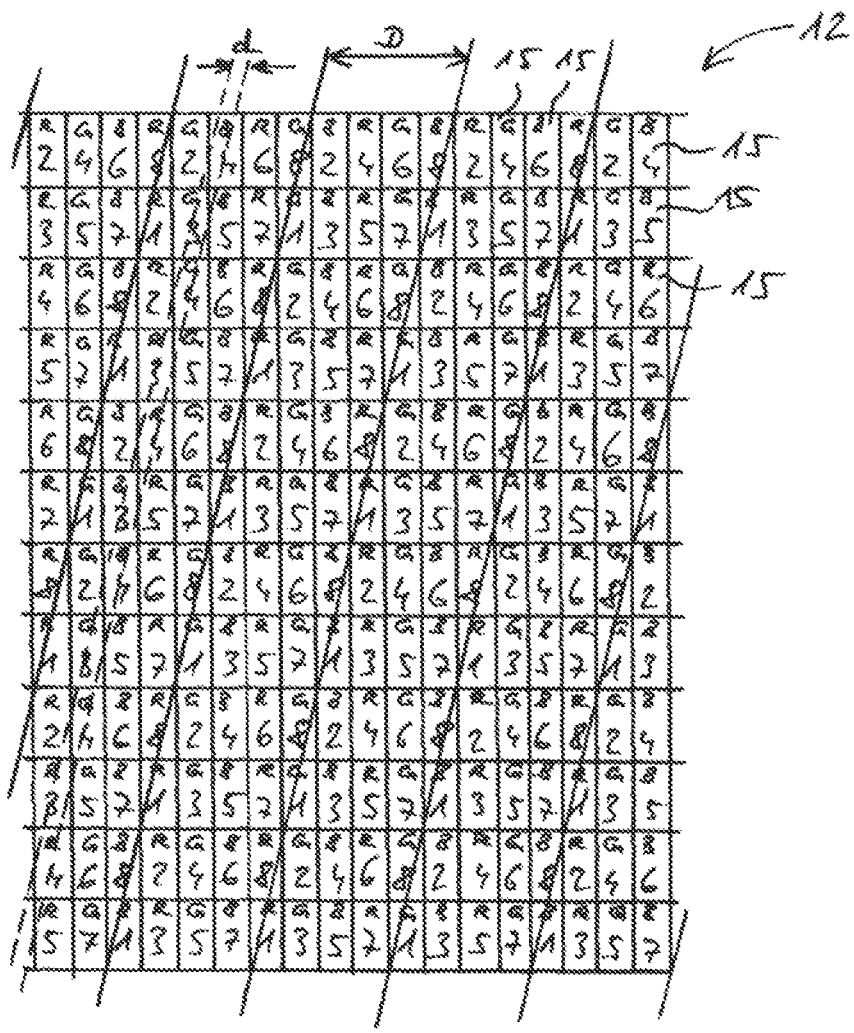

FIG. 3 in a representation corresponding to FIG. 2 shows a different example, with which the pixels 15 of the different rows are nested such that in each case a line of pixels 15 lies between the directly consecutive pixels 15 of a row, where the line comprises no pixels 15 of this row. In comparison to the example of FIG. 1 however, this leads to a smaller lateral offset d of the directly adjacent rows, and to these rows being inclined somewhat less with respect to the vertical. The special activation of the pixel matrix 12 which is described further below by way of the screen 11 of FIGS. 1 and 2 is also possible with a screen of the type shown in FIG. 3, in the same manner.

The optical grid 13 comprises a family of structures which are orientated parallel to the rows of pixels 15, arranged equidistantly to one another, and, in FIG. 2 and FIG. 3, represented in each case by unbroken lines and in each case set at least one defined propagation plane for the light departing from the pixels 15. The propagation planes thereby result due to a fan-like propagation of the light which departs from each of the pixels 15 and falls (passes) though the structures of the optical grid 13 and are each spanned from a defined horizontal propagation direction and the row direction. A period length D of the optical a grid 13 which is defined by a lateral offset of adjacent, strip-like structures is larger than the lateral offset d of the directly adjacent rows by an exact integer factor n. The mentioned factor n in the present examples is n=8, so that D is as large as eightfold the lateral offset d of directly adjacent rows of pixels. Of course, a possibly even significantly greater integer number could replace the digit of the factor of eight with other modifications of the described screen 11 and in particular in the case of a more highly resolved pixel matrix 12.

The optical grid 13 in the present case is a lens grid, wherein the strip-like structures are given by cylinder lenses. The mentioned structured in the case of modifications of the described screen 11 could also be given by transparent slots, and accordingly the optical grid 13 by a slot grid.

Figure 4:
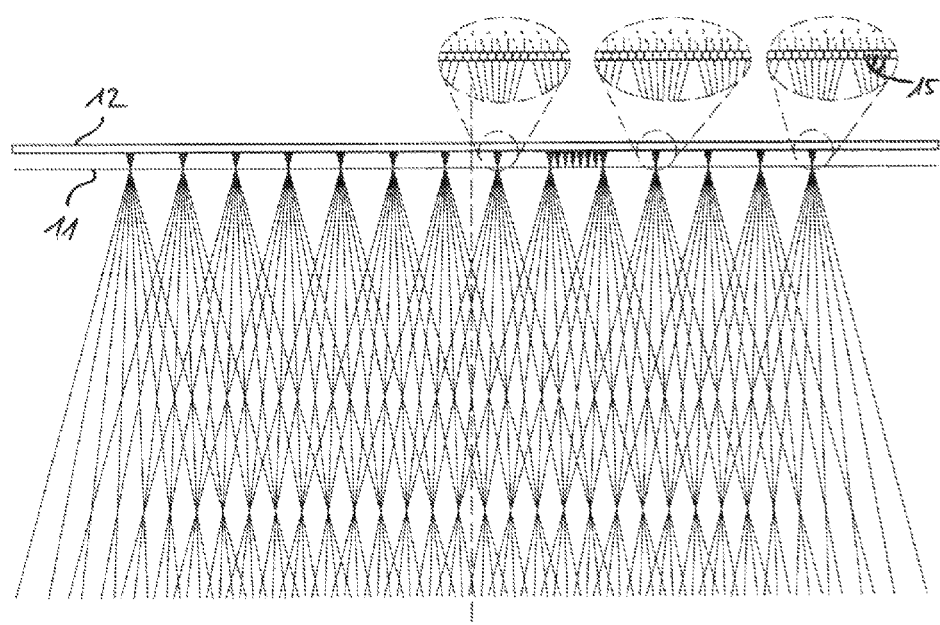

With regard to the mentioned conventional application of the screen 11, which is known under the term integral imaging or one-dimensional integral imaging, one of n—thus eight in the present case—different parallel projections of the 3D scene to be reproduced is reproduced on each of the mentioned subsets, wherein these parallel projections differ from one another by way of slightly different projection directions and are numbered from 1 to 8. This is illustrated in FIG. 4, which shows a part of the screen in a somewhat larger scale, wherein three details of the pixel matrix are represented in a manner enlarged. Each of the rows of pixels 15 which run through the respective detail in these enlarged details is illustrated in each case by a small square, wherein the rows pass through the plane of the drawing in an almost perpendicular manner. The squares can thereby be understood in each case as one of the pixels 15 of the respective row of pixels 15. The numerals from 1 to 8 which are noted in the enlarged details and with which the different pixels 15 are indicated there, thereby specify the number of the subset, to which the respective pixel 15 belongs, as well as the number of the parallel projection which is reproduced on this subset of pixels 15.

The special geometry of the present screen now leads to the fact that the light which departs from an individual subset of the subsets of pixels passes through the optical grid in parallel beams or fans (slivers), in a manner which is illustrated in FIG. 1 for example for n=8. A light field which is very similar to the light field which the reproduced 3D scene would cause in reality, results in a relatively large observation space 16 in front of the screen by way of this, wherein this space is represented in a hatched manner in FIG. 1. A viewer who is placed such that his eyes lies within the observation space 16, can three-dimensionally perceive the 3D scene on account of this, wherein he sees a mixture of the different parallel projections, by way of contributions of different parallel projections being incident into his eyes from various regions of the screen. Thereby, the viewer sees the 3D scene in each case from a perspective which corresponds to his current position within the observation space 16 and which changes with this position given a movement of the viewer.

Here now, a different type of activation of the screen 11 of FIG. 1—analogously also applicable to screen of FIG. 4—is to be described and this is comparable to the operation of a conventional multiview display. The latter differs in the case of example from the screens 11 described here by way of a different geometry which is only characterised by a slightly smaller period length D=8 dA/(A+a), wherein A is the viewing distance. The situation which is illustrated in FIG. 5 by way of dashed lines would result if, with this only slightly different geometry, one of eight stereoscopic half-pictures were to be reproduced on each of the eight subsets of pixels 15 of one of eight stereoscopic half-pictures complementary to one another in the context that they all reproduce the same scene and in each case correspond to different viewing directions or camera positions, so that they complement one another in pairs into a stereopicture of this scene with different parallax shifts. Eight viewing zones 17 with a rhomboid outline and which are represented in FIG. 5 and from which one of the half pictures would be visible in each case would then result at the viewing distance A in front of the screen 11. A lateral offset of the directly adjacent viewing zones would thereby correspond roughly to the eye distance of an average pair of eyes. Each viewer placed in front of the screen in such a manner that his eyes were to be located with a region spanned by the viewing zones 17, and there in two different viewing zones 17, could perceive the scene in a three-dimensional manner by way of this.

The enlargement of three details of the screen 11, which is illustrated in FIG. 5 in three bubbles, illustrates why this type of picture reproduction is not possible with the present screen 11 without further ado. There, details of a pixel line are shown enlarged once again for a few selected regions of the pixel matrix 12. The respective sections of the actual beam paths of FIG. 1 and FIG. 4 are shown in an unbroken manner in these enlargements. Thereby, one can recognise that the beams which are represented in a dashed manner and lead centrally into the viewing zones 17—and which, as all beams represented in the figures, in each case are to represent a middle line of the respective finitely extended light bundle—do not depart from the pixels 15 in a central manner, but from points which are laterally shifted by differently small magnitudes with respect to middle points of the pixels 15. This is a consequence of the relation D=8d which is described above, and—due to the deviation from the relationship D=[8×A/(A+a)]×d which is actually required for a corresponding multiview display—is the reason as to why the type of picture reproduction described in the preceding paragraph cannot be transferred to the present screen 11 without further ado.

A method for reproducing picture information which leads to an effect which is comparable to the conventional operation of conventional multiview display is now carried out with the screen 11 described here. For this, a special assignment is first carried out, by way of a first local coordinate value $x_1$ and a second local coordinate value $x_2$ being assigned in each case to each of the mentioned rows, wherein the first local coordinate value $x_1$ in each case specifies a location on a coordinate axis 18 which is orientated horizontally at a viewing distance A in front of the screen 11, at which location the defined propagation plane, set by the optical grid 13, of the light departing from the respective row, or one of these propagations planes, intersects this coordinate axis 18, and wherein the second local coordinate value $x_2$, in the lateral direction, specifies a location of the respective row or of the strip-like structure of the optical grid 13, through which location the light departing from the pixels 15 of this row passes. The evaluation of the first local coordinate value $x_1$ and of the second local coordinate value $x_2$ is illustrated in FIG. 5 by way of the example of a randomly selected, single beam 19 departing centrally from one of the pixels 15. The second local coordinate value $x_2$ for this can be defined as a coordinate of an intersection point of the respective row or strip-like structure with a further coordinate axis 20 orientated in the line direction of the pixel matrix, with respect to this further coordinate axis 20. The further coordinate axis 20 in FIG. 5 is represented in a manner shifted somewhat behind the pixel matrix 12, for the purpose of an improved overview.

The first local coordinate values $x_1$ with regard to this assignment assume far more than 8 different values. For illustration, the pixels 15 which can be recognised in FIG. 5 in the details represented there in an enlarged manner are characterised in each case by the first local coordinate value $x_1$ which is noted above the respective pixel 15 and which is assigned to the row, to which the respective pixel 15 belongs. In the present case, the first local coordinate values $x_1$ are thereby scaled such that the first local coordinate values $x_1$ 1, 2, 3, 4, 5, 6, 7, and 8 are assigned to eight directly adjacent rows of pixels 15 which run centrally through the pixel matrix 12. In other regions of the pixel matrix 12, the first local coordinate values $x_1$ however assume intermediate values.

The control unit 14 is firstly configured to compute the outlined assignment of first local coordinate values $x_1$ and second local coordinate values $x_2$, or, in the case that this assignment is already stored at any location, is configured to evaluate this assignment.

Based on this, an extract of a picture is computed in each case for each of the rows by picture synthesis, by way of a suitable programming of the control unit 14, wherein this picture is given in each case by a perspective of the 3D picture to be reproduced, from a position which is defined by the first local coordinate value $x_1$ assigned to the respective row, and wherein the extract is defined in each case by a strip of this picture which in this picture has a lateral position which corresponds to the second local coordinate value $x_2$ assigned to the respective row. A conventional render method can be applied for this, wherein an increased effort with regard to computation does not result when compared to conventional applications of such render methods or picture synthesis methods, due to the fact that the relatively large number of pictures are not computed to a full extent, but only the mentioned strip-like extracts, thus in each case relatively small parts of these pictures. The starting point in each case can be data which defines the 3D scene in a conventional manner and which process the applied render method or the applied picture synthesis in a manner known per se, in order to obtain the necessary pictures, even if only with extracts in each case.

Finally, the pixels 15 of the pixel matrix 12 are activated by the control unit 14 which is configured for this, such that the extract which is computed for the respective row is written into each of the rows. The computation of the extracts thereby implies the evaluation of brightness values of picture points of the extracts, wherein the extracts are written into the rows of the pixel matrix by way of the pixels 15 forming the respective row being activated with the brightness valves which are determined for the picture points of the respective extract and which are defined in a manner depending on the respective primary colour.

The eyes of a viewer who is situated with his eyes with an observation space 16' which is drawn in a dashed manner in FIG. 5, on account of this activation in each case sees contributions of a large number of the extracts cited above and accordingly, strictly speaking, a mixture of various pictures, wherein this mixture in each case corresponds extremely accurately to a realistic perspective due to the only slight perspective differences between the pictures contained therein, and wherein the perspectives which are visible to the two eyes are different to one another by a parallax shift corresponding to the eye distance. Thus the screen at each and any location within the observation space 16' provides the user with a three-dimensional impression of the reproduced 3D scene. The observation space 16' thereby corresponds roughly to a convex envelope of the viewing zones 17. It can also be somewhat larger, but is extended to a lesser extent than the observation space 16 which results with conventional integral imaging. However, instead of this, the 3D pictures which can be reproduced in the described manner are subject to less restrictions, in particular with regard to the picture depth.

Since the first local coordinate values $x_1$, as illustrated in FIG. 5, are computed in such an accurate and finely graded manner and are accordingly assigned to the rows such that the number of far more than eight different local coordinate values $x_1$ are assigned to the different rows, the extracts which are computed for the rows are also computed from a correspondingly large number of far more than eight different pictures with a corresponding number of far more than eight different perspectives.

The viewing distance A is variable and can be set at a value which can be freely selected at least within certain limits. Thereby, the control unit 14 for example can be configured to activate the pixel matrix 12 in a manner dependent on an input command defining the viewing distance A. It is also possible for the screen 11 here to additionally comprise a tracking device which is not shown here and which detects a distance of a viewer's head to the screen 11 and transfers it to the control unit 14, said control unit then defining the viewing distance A according to the measured distance and activating the pixel matrix 12 in a manner which is dependent on this.

Since the optical grid 13 comprises a multitude of the strip-like structures—thus in the present case a multitude of cylinder lenses lying next to one another or, in one of the mentioned modifications, a multitude of slots lying next to one another, through which the light departing from the pixels 15 can fall, the optical grid not only specifies one, but a finite number of different propagation planes with accordingly different horizontal propagation directions, for the light departing from the pixels 15 of each of the rows. The result of this is that the described measures for activating the pixel matrix still permits a certain margin of play when determining the first local coordinate values $x_1$ to be assigned to the rows. This margin can moreover be utilised, in order to also shift the observation space 16' laterally within certain limits.

Thereby, a propagation plane is selected from the different propagation planes, in which the light departing from the respective row can fall through the grid 13, by way of maintaining a constraint which demands that the first local coordinate value $x_1$ lies within a defined interval, in order to determine the first local coordinate value $x_1$ which is assigned to the respective row. This interval is simply defined such that it lies on the coordinate axis 18 within the observation space 16' and that its interval limits at least approximately correspond to lateral delimitations or boundaries of the observation space 16'.

The first local coordinate values $x_1$ are thereby to be assigned to the rows in each case such that the rows are distributed onto groups of in each case eight or nine, or in individual cases under certain circumstances, also ten, directly adjacent rows, within which the first local coordinate values $x_1$ which are assigned to the rows of the respective group differ from row to row by a local coordinate difference, which is the same for all groups, of one in the present case or slightly more than one, wherein the first local coordinate values $x_1$ which are assigned to the rows of each of these groups in each case span a coordinate interval which is at least eight times larger than the mentioned local coordinate difference. This can be easily recognised in FIG. 5 in the three enlarged details.

With a special variant of the activation of the pixel matrix 12 which is described here, at least some of the rows which lie at an edge of one of the mentioned group of rows are additionally assigned to the adjacent group of rows which connects to this edge of the group. Accordingly, two first local coordinate values $x_1$ which are defined by two of the propagation planes, are assigned to these rows, of which as a whole six are to be seen in the details of FIG. 5 which are once again enlarged, and whose pixels 15 can be recognised there represented in a hatched manner. These two first local coordinate values $x_1$ for the six cases which can be recognised in FIG. 5, in the scaling selected there, in one case are 0,8 and 8,9, in another case 0,7 and 8,8, in a third case 0,5 and 8,6, in a fourth case 0,4 and 8,5, in a fifth case 0,3 and 8,4 and in a sixth case 0,2 and 8,3. One of the two first local coordinate values $x_1$ which are assigned to the respective row is thereby written below the respective pixel 15. This double assignment is carried out precisely with those rows which, with the selected or desired observation space 16', lie precisely such that the light which departs from there through two adjacent structures of the optical grid 13 leaves the optical grid 13 in each case such that it is incident into the observation space 16' precisely or almost precisely at two lateral boundaries of the observation space 16'. A larger or a smaller weighting, thus a larger or smaller weighting factor can be assigned to one or the other of these propagation directions, depending on with which of the two propagation directions being considered, the light falls further into the viewing space 16', as indicated in FIG. 5. The weighting factors are in each case written into FIG. 5 by way of a percentage number at the respective first local coordinate value $x_1$. Then, in each case two extracts are computed for each of these selected rows, on the basis of in each case one of the two first local coordinate values $x_1$ which are assigned to the respective row, wherein the pixels 15 of these rows are activated in each case with an averaged brightness value. Thereby, this averaged brightness value is determined by averaging brightness values which are defined by the two extracts, wherein these brightness values are weighted with the mentioned weightings or weighting factors, which complete to 100%. Disturbing artefacts which could otherwise arise on account of crosstalk, in particular with a viewing of the screen 11 from a position close to the lateral boundaries of the observation space 16', can be lessened or prevented by way of this measure.

The mentioned averaged brightness values, with which the pixels 15 of the rows are activated, to which rows two first local coordinate values $x_1$ are assigned and for which rows two extracts are computed, in this case are therefore are determined as a sum of a first brightness value weighted by a first weighting factor and a second brightness value weighted with a second weighting factor, wherein the first brightness value is that brightness value which is defined by a first of the two extracts for the respective pixel 15, whereas the second brightness value is that which is defined by the second of these two extracts for the same pixel 15. The first weighting factor and the second weighting factor are thereby defined by a suitable programming of the control unit 14 for each of the rows of pixels 15 concerned, in each case in a manner depending on how close the respective local coordinate value $x_1$ lies to a boundary of the interval mentioned above, which in the present case is defined as reaching from 0,1 to 8,9. A particularly low-disturbance picture reproduction thus results.

The closer the first local coordinate value $x_1$, on the basis of which the first extract is computed, lies to the interval boundary of the mentioned interval, the smaller is the first weighting factor which is defined for one of the rows in each case, whereas the closer the first local coordinate value $x_1$, on the basis of which the second extract is computed, lies to an interval boundary of the mentioned respective interval, the smaller is the second weighting factor which is defined for the respective row. The smaller the first weighting factor, the larger is the second weighting factor, and vice versa.

The invention claimed is:

1. A method for reproducing picture information on an autostereoscopic screen which comprises a pixel matrix with a multitude of pixels, as well as an optical grid which is arranged in front of the pixel matrix, wherein the pixels of the pixel matrix are arranged such that they form a multitude of rows which are arranged equidistantly next to one another and are with a vertical row direction or one which is inclined with respect to a vertical, and wherein the optical grid comprises a family of strip-like structures which are orientated parallel to the rows and are arranged equidistantly next to one another and in each case sets at least one defined propagation plane for light departing from the pixels, said propagation plane spanned from a defined horizontal propagation direction and the row direction, wherein a period length of the optical grid which is defined by a lateral offset of adjacent, strip-like structures is larger than a lateral offset of the directly adjacent rows by an integer factor n, wherein n is larger than two, wherein the pixel matrix is activated for an autostereoscopic viewing of a 3D picture from a viewing distance in front of the screen, and wherein the method comprises the following steps:

assigning in each case a first local coordinate value and a second local coordinate value to each of the rows, wherein the first local coordinate value in each case specifies a location on a coordinate axis which is horizontally orientated at the viewing distance in front of the screen, at which location the defined propagation plane, set by the optical grid, of the light departing from the row to which the first local coordination value is assigned, or one of these propagation planes, intersects this coordinate axis, and wherein the second local coordinate value, in a lateral direction specifies a position of the row to which the second local coordination value is assigned or of the strip-like structure of the optical grid, through which position the light departing from the pixels of this row falls, for each of the rows, computing in each case an extract of a picture by way of picture synthesis, wherein this picture is given in each case by a perspective of the 3D picture to be reproduced, from a position which is defined by the first local coordinate value assigned to the row, and wherein the extract is defined in each case by a strip of this picture which in this picture has a lateral position corresponding to the second local coordinate value assigned to the row, and activating the pixels of the pixel matrix in a manner such that the extract computed in such a manner for this row is written into each of the rows, thereby displaying the 3D picture such that it is autostereoscopically perceivable as being three-dimensional from an observation space which lies at the viewing distance in front of the autostereoscopic screen.

2. A method according to claim 1, characterised in that the computation of the extracts comprises evaluating brightness values of picture points of the extracts, wherein the extracts are written into the rows of the pixel matrix, by way of activating, for each of the rows, the pixels forming the row with the brightness values which are determined for the picture points of the extract computed for this row.

3. A method according to claim 1, characterised in that the first local coordinate value in each case is determined in such a precise manner that a number of different first local coordinate values which is greater than n is assigned to the rows.

4. A method according to claim 1, characterised in that the optical grid in each case sets a finite number of different propagation planes with accordingly different horizontal propagation directions for the light departing from the pixels of each row or from the pixels of some of the rows, and these propagation directions result due to the fact that the light falls through different ones of the strip-like structures of the optical grid, wherein a propagation plane is selected from these propagation planes by way of keeping a constraint which demands that the first local coordinate value lies within a defined interval, in order to determine the first local coordinate value assigned to each of the rows.

5. A method according to claim 4, characterised in that the first local coordinate values are assigned to the rows such that the rows are distributed onto groups of in each case n or n+1 or n+2 directly adjacent rows, wherein, within each of the groups, the first local coordinate values assigned to the rows of the group differ from row to row by a local coordinate difference which is the same for all groups, wherein the first local coordinate values which are assigned to the rows of each of these groups, in each case span a coordinate interval which is at least n-times as large as the mentioned local coordinate difference.

6. A method according to claim 5, characterised in that at least some of the rows which lie at an edge of one of the groups of rows, are additionally assigned to an adjacent group of the groups of rows which connects to this edge of the group, and that two first local coordinate values which are defined by two of the propagation planes are accordingly assigned to these rows, wherein accordingly two extracts in each case are computed for these rows on the basis of in each case one of these two first local coordinate values, and wherein the pixels of these rows are activated in each case with an averaged brightness value which results by way of averaging brightness values which are defined by these two extracts.

7. A method according to claim 6, characterised in that for each of the pixels of the rows, to which two first local coordinate values are assigned and for which two extracts are computed, the averaged brightness value is determined as a sum of a first brightness value weighted by a first weighting factor and of a second brightness value weighted by a second weighting factor, wherein the first brightness value is defined by a first of the two extracts for the pixel, and the second brightness value is defined by the second of these two extracts for the same pixel.

8. A method according to claim 7, characterised in that the first weighting factor and the second weighting factor are defined in each case in a manner depending on how close the first local coordinate value lies to a boundary of the mentioned interval.

9. A method according to claim 7, characterised in that the smaller a distance of the first local coordinate value, on the basis of which the first extract is computed to an interval boundary of the mentioned interval, the smaller defined is the first weighting factor, whereas the smaller a distance of the first local coordinate value, on the basis of which the second extract is computed to an interval boundary of the mentioned interval, the smaller defined is the second weighting factor.

10. A method according to claim 1, characterised in that the viewing distance is variable and is defined in a manner depending on an input command or a value measured by a tracking device.

11. An autostereoscopic screen which comprises a pixel matrix with a multitude of pixels, an optical grid which is arranged in front of the pixel matrix, and a control unit for activating the pixel matrix,
   wherein the pixels of the pixel matrix are arranged such that they form a multitude of rows which are arranged equidistantly next to one another and are with a vertical row direction or one which is inclined with respect to a vertical,
   wherein the optical grid comprises a family of strip-like structures which are orientated parallel to the rows and are arranged equidistantly next one another and in each case sets at least one defined propagation plane for light departing from the pixels, said propagation plane being spanned from a defined horizontal propagation direction and the row direction, wherein a period length of the optical grid which is defined by a lateral offset of adjacent, strip-like structures is greater than a lateral offset of the directly adjacent rows by an integer factor n, wherein n is larger than two
   and wherein the control unit is configured to activate the pixel matrix for an autostereoscopic viewing of a 3D picture at a viewing distance in front of the screen and, for this, to carry out the following steps:
      computing or evaluating an assignment, which assigns in each case a first local coordinate value and a second local coordinate value to each of the mentioned rows, wherein the first local coordinate value in each case specifies a location on a coordinate axis which is horizontally orientated at the viewing distance in front of the screen, at which location the defined propagation plane, set by the optical grid, of the light departing from the row to which the first local coordinate value is assigned, or one of these propagation planes, intersects this coordinate axis, and wherein the second local coordinate value, in a lateral direction specifies a position of the row to which the second local coordinate value is assigned or of the strip-like structure of the optical grid, through which position the light departing from the pixels of this row falls,
      for each of the rows, computing in each case an extract of a picture by way of picture synthesis, wherein this picture is given in each case by a perspective of the 3D picture to be reproduced, from a position which is defined by the first local coordinate value assigned to the row, and wherein the extract is defined in each case by a strip of this picture which in this picture has a lateral position corresponding to the second local coordinate value assigned to the row, and activating the pixels of the pixel matrix in a manner such that the extract computed for this row is written into each of the rows, thereby displaying the 3D picture such that it is autostereoscopically perceivable as being three-dimensional from an observation space which lies at the viewing distance in front of the autostereoscopic screen.

12. An autostereoscopic screen according to claim 11, characterised in that the control unit, when computing the extracts, is configured to determine brightness values of picture points of the extracts and to write the extracts into the rows of the pixel matrix by way of activating, for each of the rows, the pixels forming the row, with the brightness values determined for the picture points of the extract computed for this row.

13. An autostereoscopic screen according to claim 11, characterised in that the mentioned assignment assigns a number of different first local coordinate values to the rows, said number being greater than n, so that the control unit is configured to compute the extracts for the rows of the pixel matrix from a corresponding number of different pictures of a corresponding number of different perspectives.

14. An autostereoscopic screen according to claim 11, characterised in that the optical grid in each case sets a finite number of different propagation planes with accordingly different horizontal propagation directions for the light departing from the pixels of each row or from the pixels of some of the rows, said propagation directions resulting due to the fact that the light falls through different ones of the strip-like structures of the optical grid, wherein the first local coordinate value assigned to the rows lie within a defined interval.

15. An autostereoscopic screen according to claim 14, characterised in that the first local coordinate values are assigned to the rows such that the rows are distributed onto groups of in each case n or n+1 or n+2 directly adjacent rows, wherein, within each of the groups, the first local coordinate values assigned to the rows of the group differ from row to row by a local coordinate difference which is the same for all groups, wherein the first local coordinate values which are assigned to the rows of each of these groups, in each case span a coordinate interval which is at least n-times larger than the mentioned local coordinate difference.

16. An autostereoscopic screen according to claim 15, characterised in that at least some of the rows which lie at an edge of one of the mentioned groups of rows, are additionally assigned to an adjacent group of the group of rows which connects to this edge of the group and that accordingly two first local coordinate values defined by two of the propagation planes are assigned to these rows, wherein the control unit is configured, for these rows, to accordingly compute in each case two extracts on the basis of in each case one of these two first local coordinate values and to activate the pixels of these rows in each case with an averaged brightness value which results by way of averaging brightness values which are defined by these two extracts.

17. An autostereoscopic screen according to claim 16, characterised in that the control unit is configured to determine, for each of the pixels of the rows to which two first local coordinate values are assigned, the averaged brightness value as a sum of a first brightness value weighted by a first weighting factor and a second brightness value weighted by a second weighting factor, wherein the first brightness value is defined by a first of the two extracts for the pixel and the second brightness value is defined by the second of these two extracts for the same pixel.

18. An autostereoscopic screen according to claim 17, characterised in that the control unit is configured to define the first weighting factor and the second weighting factor in each case in a manner depending on how close the first local coordinate value lies to a boundary of the mentioned interval.

19. An autostereoscopic screen according to claim 17, characterised in that the control unit is configured to define the first weighting factor smaller, the smaller a distance of the first local coordinate value on the basis of which the first extract is computed to an interval boundary of the mentioned interval, and to define the second weighting factor smaller, the smaller a distance of the first local coordinate value on the basis of which the second extract is computed to an interval boundary of the mentioned interval.

20. An autostereoscopic screen according to claim 11, characterised in that the optical grid is a lens grid or slot grid, wherein the strip-like structures are given by cylinder lenses or by transparent slots.

21. An autostereoscopic screen according to claim 11, characterised in that the pixel matrix is given by a liquid crystal screen or an LED screen or a plasma screen.

22. An autostereoscopic screen according to claim 11, characterised in that the pixels of the pixel matrix are arranged in a multitude of lines, wherein each of the mentioned rows comprises at the most one pixel from each of the lines.

23. An autostereoscopic screen according to claim 11, characterised in that the viewing distance is variable, wherein the control unit is configured to activate the pixel matrix in a manner dependent on an input command defining the viewing distance or on a measurement result determined by a tracking device.

* * * * *